United States Patent [19]

Garron

[11] 4,064,442
[45] Dec. 20, 1977

[54] ELECTRIC MOTOR HAVING PERMANENT MAGNETS AND RESONANT CIRCUIT

[75] Inventor: Carlos Subieta Garron, Takoma Park, Md.

[73] Assignee: CSG Enterprises, Inc., New York, N.Y.

[21] Appl. No.: 667,501

[22] Filed: Mar. 17, 1976

[51] Int. Cl.$^2$ .................................... H02K 37/00
[52] U.S. Cl. ................................ 318/254; 310/46
[58] Field of Search ............... 310/46; 318/138, 254, 318/130

[56] References Cited

U.S. PATENT DOCUMENTS

| | | | |
|---|---|---|---|
| 1,859,643 | 5/1932 | Worthington | 310/46 |
| 2,040,677 | 5/1936 | Suits | 318/130 |
| 3,313,993 | 4/1967 | Rupp | 318/254 |

Primary Examiner—Donovan F. Duggan
Attorney, Agent, or Firm—Fitzpatrick, Cella, Harper & Scinto

[57] ABSTRACT

An electric motor having in each of the rotor and the stator a permanent magnet and an electromagnet of equal strength placed in parallel relation such that when the electromagnet coil is activated the flux of the magnets is additive and when the coil is deactivated the flux of the permanent magnet takes a closed circuit path through the electromagnet core, the rotor being mounted on a shaft for rotation relative to the stator and a commutator switch being included for alternately connecting and disconnecting the electromagnet coils to and from a power source, wherein capacitors are provided in the coil circuit. The capacitor and coil circuit is designed to have a resonant frequency roughly equal to or near the switching frequency of the commutator switch at the intended shaft operating speed, thereby causing the capacitors to alternately store energy from and discharge energy to the coils. The combination of permanent magnets with electro-magnets and the addition of capacitors in the coil circuit to form a resonant circuit results in increased efficiency of the motor.

5 Claims, 13 Drawing Figures 4,064,442

ELECTRIC MOTOR HAVING PERMANENT MAGNETS AND RESONANT CIRCUIT

BACKGROUND OF THE INVENTION

A number of prior art electric motors are known in which permanent magnets are used in conjunction with electromagnets in the magnetic flux circuit. Examples of such motors are given in U.S. Pat. Nos. 1,859,643; 1,863,294; 3,396,296 and 3,426,224; as well as in copending U.S. application Ser. No. 402,284, filed Oct. 1, 1973, of Carlos Subieta Garron, inventor of the present invention.

SUMMARY OF THE INVENTION

The present invention comprises an improvement in the type of motor described in detail below and in the aforementioned U.S. application Ser. No. 402,284, wherein electromagnets are used to alternately supplement and short-circuit the flux of permanent magnets in the rotor and stator as a commutator switch on the motor shaft connects the coils to and disconnects the coils from a power source at a frequency dependent on the shaft speed. The improvement comprises the inclusion of capacitors in the coil circuit such that a resonant circuit is formed having a resonant frequency approximately equal to the commutator switching frequency. The capacitors store energy in the circuit during that portion of the switching cycle when the power source is disconnected, thereby reducing the outside power needed to recharge the coils during the next portion of the switching cycle.

DESCRIPTION OF THE PREFERRED EMBODIMENTS

Figure 1:
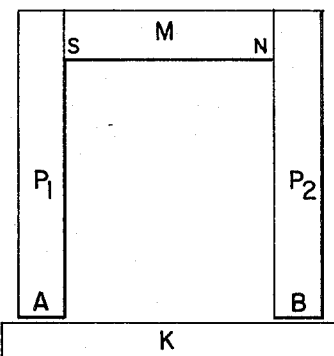
FIG. 1 shows a permanent magnet in contact with two iron armatures and supporting a keeper.

Referring now in greater detail to the drawings, FIG. 1 shows a magnet M in contact with two iron armatures P1 and P2. At the extreme ends A and B of armatures P1 and P2, respectively, the magnetic pole of the magnet manifests itself and is capable of attracting and supporting against the force of gravity a ferromagnetic keeper K with a weight X. If an iron piece I is introduced between the iron armatures P1 and P2 to close the magnetic circuit as in FIG. 2, the lines of attraction of the magnet will follow the path indicated by the arrows, thereby forming a toroid or closed magnetic flux circuit. This will result in no magnetic attraction at the ends A and B of the iron armatures P1 and P2. If a keeper K is now placed across ends A and B, the armatures will not be able to support the keeper's weight X. In fact, the armature will support a maximum weight of perhaps X/100, depending of course on the precision of the apparatus. Experimental observations made by the inventor have established that for all practical purposes the flux force of the magnet is shunted by the introduction of iron piece I as described above with respect to FIG. 2 and the pole pieces will have no appreciable attraction toward a keeper.

Figure 2:
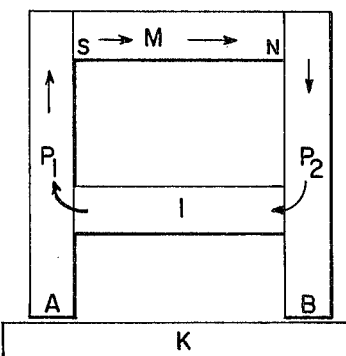
FIG. 2 shows the apparatus of FIG. 1 with an iron bar introduced between the armatures.
Figure 3:
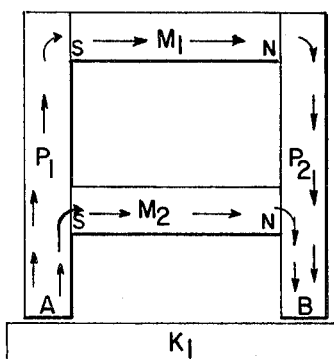
FIG. 3 shows the additive flux effect of two permanent magnets arranged in a parallel flux circuit.

The arrangement of FIG. 3 is similar to that of FIG. 2 except that the iron bar I of FIG. 2 has been replaced by permanent magnet M2 and is in parallel with the magnet M1. The magnetomotive force (MMF) of magnet M1 is the same as that of magnet M2 and, in this case, the polarities of magnets M1 and M2 are aligned so that the maxwells (magnetic fluxes) are additive, resulting in a south pole appearing at end A of armature P1 and a north pole appearing at end B of armature P2. However, the magnetic flux density at poles A and B is double that of the arrangement of FIG. 1. That is to say, the number of gausses at the ends A and B of the armatures P1 and P2 are twice the values for the FIG. 1 arrangement. It is to be understood that the armatures P1 and P2 have been dimensioned so that saturation of the armature material will not be reached under the conditions illustrated herein. Conforming to the laws of magnetic attraction, the arrangement of FIG. 3 will support theoretically a keeper K1 having a weight 4X because the attraction of the keeper to armature ends A and B increases with the square of the ratio of magnetic flux density.

Figure 4:
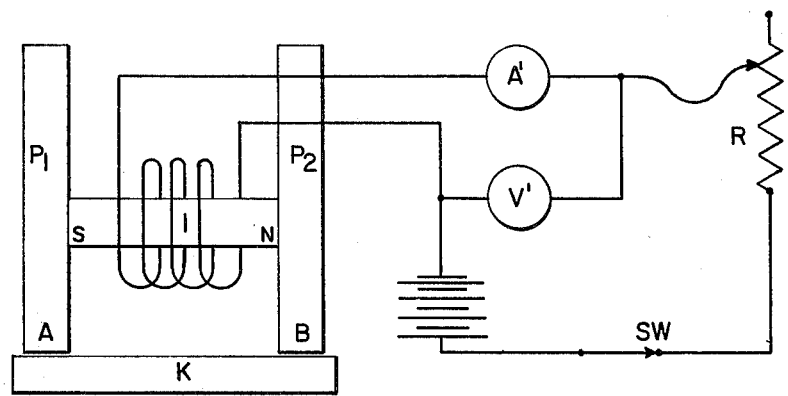
FIG. 4 shows a device for assuring that the electromagnet flux will be equal in magnitude to that of a comparable permanent magnet.
Figure 5:
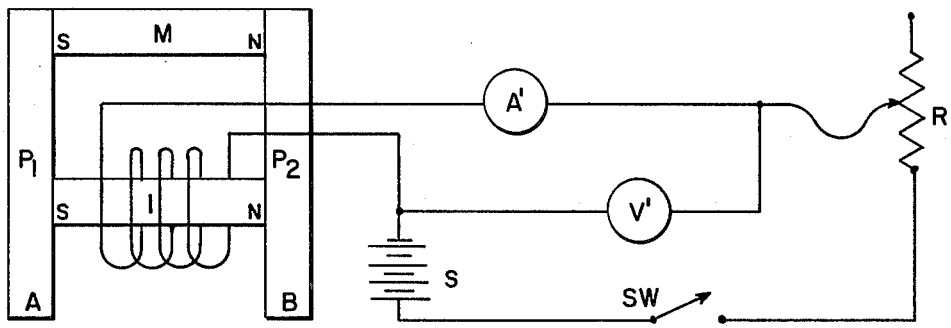
FIG. 5 shows a static device for illustrating the principle of the type of motor with which the present improvement invention is concerned.

FIG. 4 shows the arrangement OF FIG. 2 with the magnet M1 removed and with iron bar I having a coil wound around it. This circuit is also provided with a variable resistor R, an ammeter A and a voltmeter V, a power source S and a switch SW. When switch SW is closed the current flows through the coil and the core I is magnetized. The current flows so that the polarity of the iron bar I is aligned with that shown for the magnet M of FIG. 2. The resistor R in FIG. 5 is regulated so as to obtain the same attraction force at the ends A and B of the armatures P1 and P2 as was produced by the magnet M of FIG. 2. Thus, the FIG. 4 arrangement will support a keeper K of weight X. Once this has been achieved, the amperage and voltage readings of the ammeter A' and the voltmeter V' respectively, are taken. In one actual test the values measured by the inventor were 0.8 amps and 10 volts, respectively.

In FIG. 5 the magnet M is once again introduced between the armatures P1 and P2. Switch SW is in the open position and since there is no current flowing through the coil around the iron core I the result is the same one as was described above with regard to FIG. 2. This is to say, a closed magnetic flux circuit is produced by the device of FIG. 5 with switch SW open. At the ends A and B of the armatures P1 and P2 there is therefore no appreciable magnetic attraction.

When the switch SW of FIG. 5 is closed, current will flow through the magnetizing coil of core I and an MMF will be produced in the core I which has the same magnitude as the MMF of magnet M. Since the polarity of magnetized core I is aligned with the polarity of magnet M in FIG. 5, the result is the same as that described above with respect to FIG. 3. At the ends A and B of the armatures P1 and P2 the magnet flux density (in gausses) will be double that of magnet M or magnetized core I taken alone. Therefore, the magnetic force at ends A and B of poles P1 and P2 will theoretically support a keeper K1 of weight 4X. In actual tests conducted by the inventor it was found that a keeper of weight 3.3X - 3.5X was supported by the device. The lower value is attributed to inaccuracy of measurement and imprecision of the components. Even with these experimental results it can be seen that the weight which is supported by the apparatus of FIG. 5 with switch SW closed is greater than the sum of the weights which could be supported by magnet M or magnetized core I standing alone.

The foregoing discussion illustrates the following principles with respect to the arrangement of FIG. 5:

1. With switch SW closed and a magnetizing current through the coil of core I producing a flux equal to that of magnet M, an attraction force of 3-4 times that possible with magnetized core I standing alone is obtained. This significant increase in magnetic attraction force is a result of the contribution of magnet M.

2. With switch SW open the flux of magnet M is shunted through the non-magnetized core I and the magnetic attraction of the pole pieces toward an external body is substantially zero.

Figure 6:
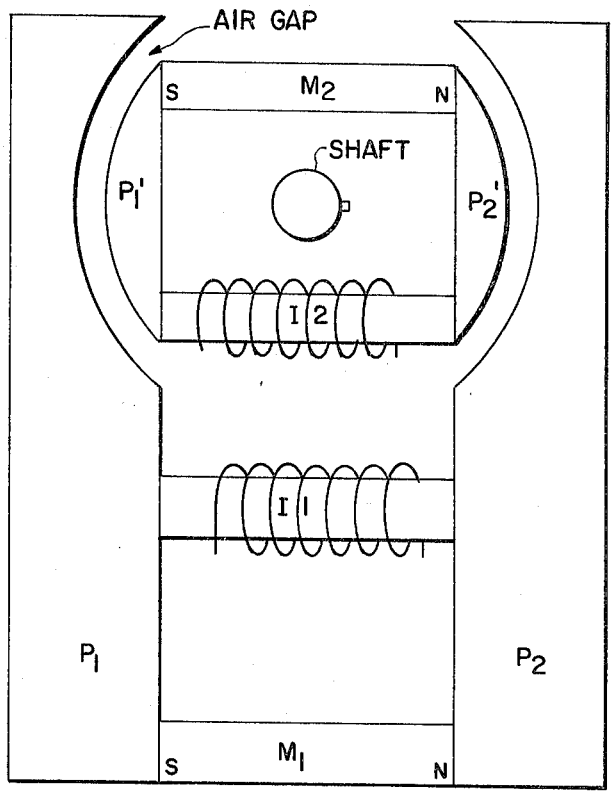
FIG. 6 shows in schematic form a motor of the type with which the present invention is concerned.

FIG. 6 shows a motor utilizing the principles established above with respect to FIG. 5. The rotor is composed of a permanent magnet M2, armatures P1' and P2', and ferromagnetic core I2 having a magnetizing coil. The rotor is mounted for rotation with a shaft and rotates, for example, in the clockwise direction when the motor is operating. When no current flows in the magnetizing coil of core I2, the magnetic flux of magnet M2 is short circuited so as to form a closed magnetic flux circuit. There is therefore no manifestation of magnetic pole in P1' and P2'.

The motor stator in FIG. 6 is composed of a permanent magnet M1, armatures P1 and P2 and iron bar I1 having a magnetizing coil. The stator magnet, core and armature pieces are rigidly connected to the frame of the motor. When no current is supplied to the coil of core I1 the magnetic flux from magnet M1 becomes short circuited, forming a closed magnetic flux circuit. There will therefore be no manifestation of magnetic pole in armatures P1 and P2 and the upper parts of the armatures P1 and P2 adjacent the rotor will not exert a force on the rotor. It will be seen that when no current passes through the rotor and stator coils, the rotor will be allowed to rotate freely on its shaft.

For convenience, the power supply and commutator switches for the coils of cores I1 and I2 are not shown. It will be understood that the current supplied to the coil of core I1 is that necessary to make the MMF of I1 approximately equal to that of magnet M1. Similarly the current supplied to the coil of core I2 is only the amount necessary to make the MMF of I1 approximately equal to that of magnet M2. The commutator switches may be of any conventional type known in the art and those skilled in the art will readily understand how to construct such commutators in view of the discussion which follows below.

Figure 7:
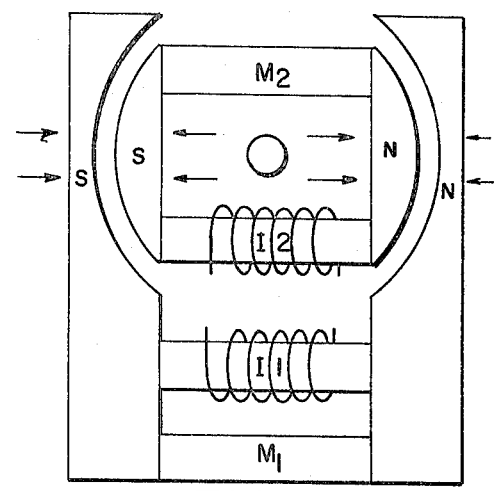
FIGS. 7-9 show the motor of FIG. 6 in various stages of the operating cycle.
Figure 13:
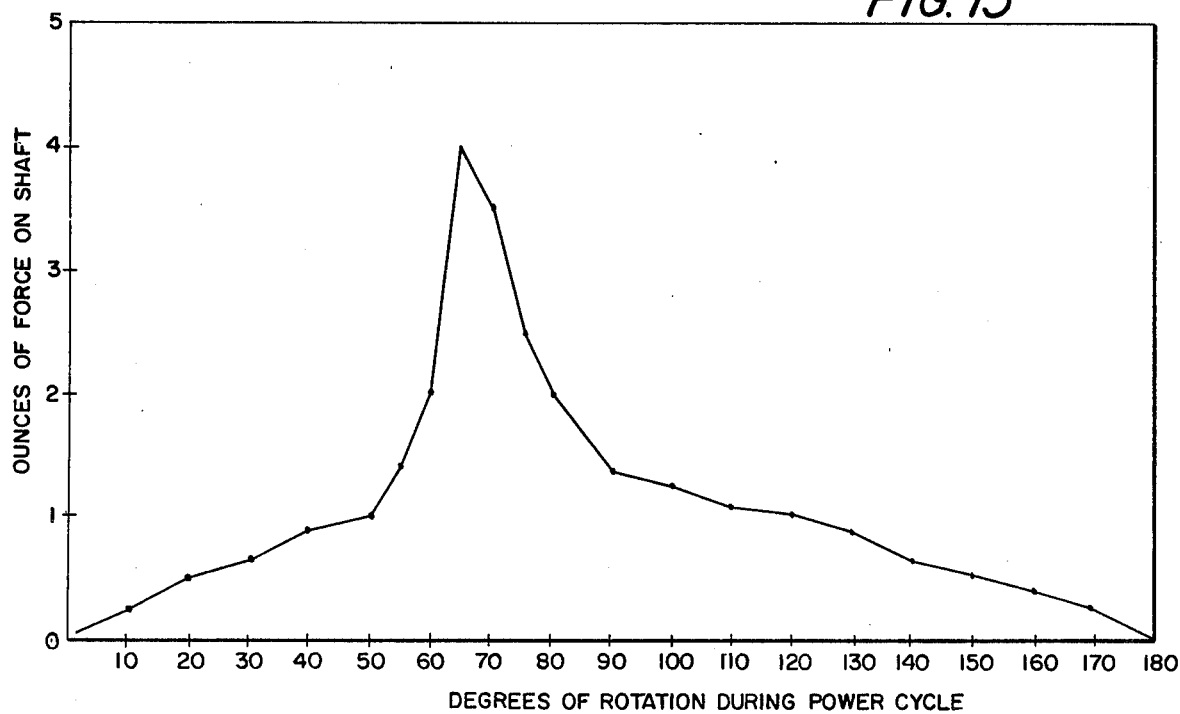
FIG. 13 shows the output force obtained from the rotor shaft of the motor FIGS. 6 and 11.

When the commutator switch is closed, current will flow through both the rotor and the stator coils and, at the same time, magnetic poles will appear in both the rotor and stator armatures as shown in FIG. 7. Of course, a magnetic repulsion of like poles will occur as indicated by the arrows. The repulsion forces are the same at both sides of the shaft, but in opposite direction, so that they are annulled and no torque will be produced upon the shaft. If the rotor is rotated slightly in the clockwise direction, then the south pole of the rotor will be repelled by the south pole of the stator and at the same time attracted by the north pole of the stator. Similarly, the north pole of the rotor will be repelled by the north pole of the stator and equally attracted by the south pole of the stator, thereby producing a torque in the clockwise direction on the rotor shaft. It can thus be deduced that the force acting to turn the rotor when it is in the position of FIG. 7 is zero and this force increases until the rotor reaches the position indicated in FIG. 8. The rotational force acting on the rotor is approximately proportional to the sine of the angle of rotation from FIG. 7 to FIG. 8, and this is shown graphically in FIG. 13.

Figure 9:
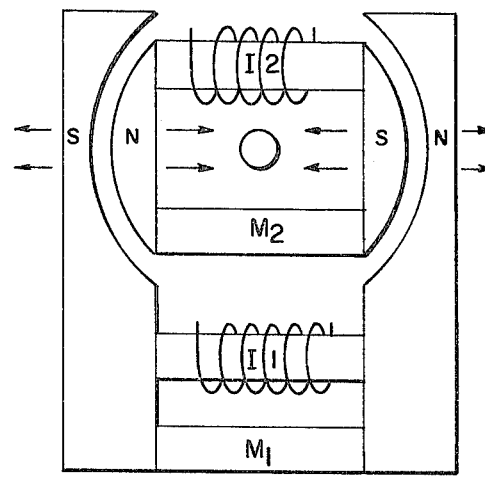

FIG. 9 indicates a similar condition to the one shown in FIG. 7, the difference being that at both ends of the rotor an attraction force exists toward the stator armatures. Because the forces in FIG. 9 are acting in opposite directions no torque will be produced on the shaft since the forces cancel each other. The resultant force on the shaft is therefore zero. When the rotor reaches the position indicated in FIG. 9 the commutator shuts off the current simultaneously in the rotor and the stator coils, leaving both the rotor and the stator with closed magnetic flux circuits having no external magnetic effect. Inertia of the rotor will then cause it to rotate freely until it again reaches the position indicated in FIG. 7. When the rotor is slightly past the position of FIG. 7 the commutator once again supplies current to both the rotor and the stator coils and the cycle repeats itself.

Figure 8:
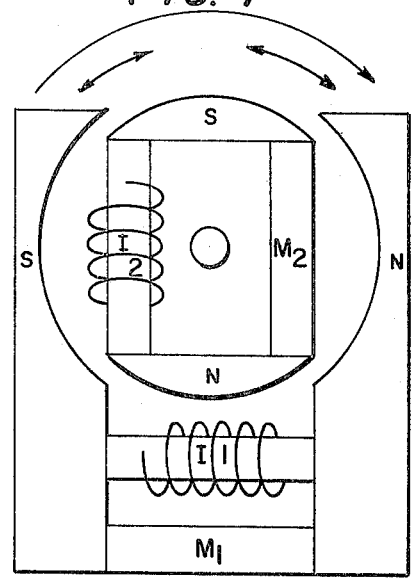
Figure 10:
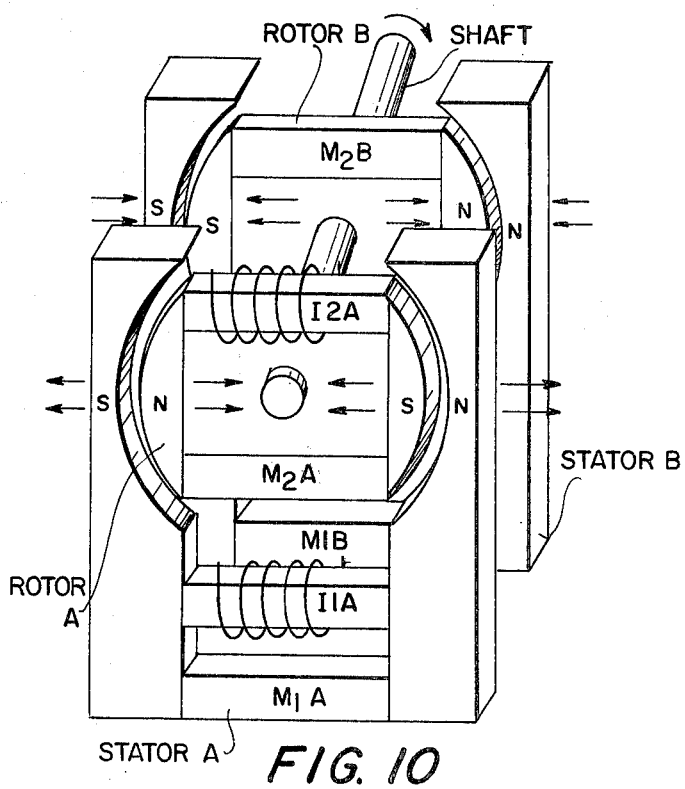
FIG. 10 shows a motor of the type shown in FIG. 6 wherein multiple rotor/stator pairs are provided along a single shaft.

It can be seen from this description of FIGS. 7-9 that the rotor and the stator receive current only during 180° of each revolution. If two rotors are positioned on the same shaft, each one with its own stator as shown in FIG. 10, they can be arranged so that when one rotor/stator pair is activated the other rotor/stator pair is in the closed magnetic flux state. Rotor A is 180° out of phase with rotor B as indicated, so that when the shaft is in the position shown, the coils of I1A and I2A have just been switched off by the commutator and the coils of I1B and I2B (not shown) have been switched on by the commutator. When the shaft of FIG. 10 has rotated an additional 90°, rotor B and stator B will have the magnetic poles as shown in FIG. 8 while rotor A and stator A will be in the closed magnetic flux state. Similarly, a larger number of rotor/stator pairs can be arranged in spaced relation on a single motor shaft such that the power supplied to the shaft is substantially constant through the entire 360° of rotation. For example, if 18 rotor/stator pairs are provided, a rotor will be positioned at each 20° increment around the shaft. Power may be supplied to each rotor/stator pair over 180° of the rotor's rotation or, preferably may be supplied only during a portion of such 180° period. For example, a motor having 18 rotor/stator pairs may have power supplied to each pair over 20° of the total 360° of one shaft revolution.

Figure 11:
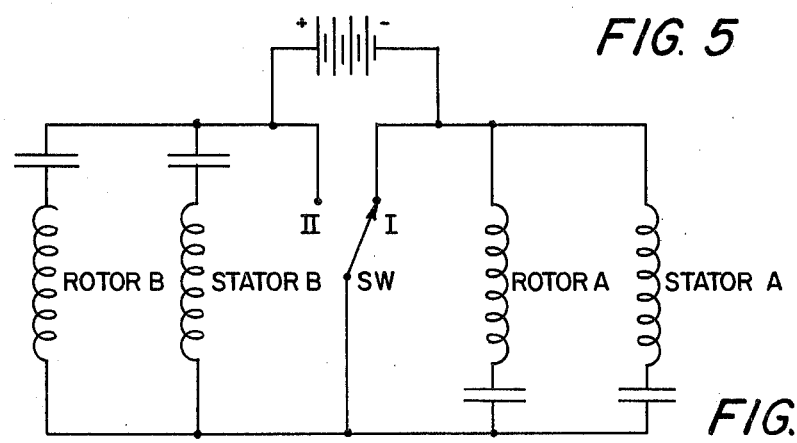
FIG. 11 shows in schematic form the improvement according to the present invention, wherein capacitors are provided in the coil circuit for temporarily storing energy during a portion of the operating cycle.

The inventor has found that the efficiency of the motor design described above and having permanent magnets in the magnetic flux circuit is significantly greater than that for a similar motor which utilizes only the electromagnets, without relying on the permanent magnets for part of the effective flux. The efficiency may be further improved, however, by the addition of capacitors to the electromagnet coil circuit as shown in FIG. 11. Each rotor or stator coil is provided with its own capacitor to form a resonant circuit.

It is well known that when an inductance is connected in a circuit of alternating current the current will lag by 90° with respect to the voltage (neglecting the resistive value of the inductance), and that when a capacitor is connected in a circuit of alternating current the current leads by 90° with respect to the voltage (neglecting current losses in the capacitor). In other words, the inductive and capacitive effects are the same but are 180° out of phase.

The power drawn by an alternating current circuit in which the current is out of phase relative to the voltage can be calculated as follows:

$$P = I \cdot E \cdot \cos \phi$$

Where:

$\cos \phi$ = the angle by which current lags with respect to voltage. The value of the cosine $\phi$ can vary from 0 to 1. If the value reached zero, the power consumed by the circuit would be zero (impossible in practice). But if the $\cos \phi = 1$, then the power consumed is:

$$P = I \cdot E$$

The condition when $\cos \phi = 1$ in a reactive circuit is called resonance and, when present, it causes the counter EMF $e$ to be annulled.

If the coil resistance is small the instantaneous current will attain extremely high values. Similarly, the voltage across the capacitors will reach a much higher value than that of the applied voltage source depending on the Q factor of the coils. The Q factor is given by:

$$Q = X/R$$

Where:

$X$ = Inductive reactance of the coils
$R$ = Resistance of the coils

The value of Q in a given coil can be increased by reducing the resistance of the coil or by increasing the diameter of the wire. The voltage $E_c$ across each capacitor is given by:

$$E_c = Q \cdot E$$

Where:

$E$ is the applied voltage

Figure 12:
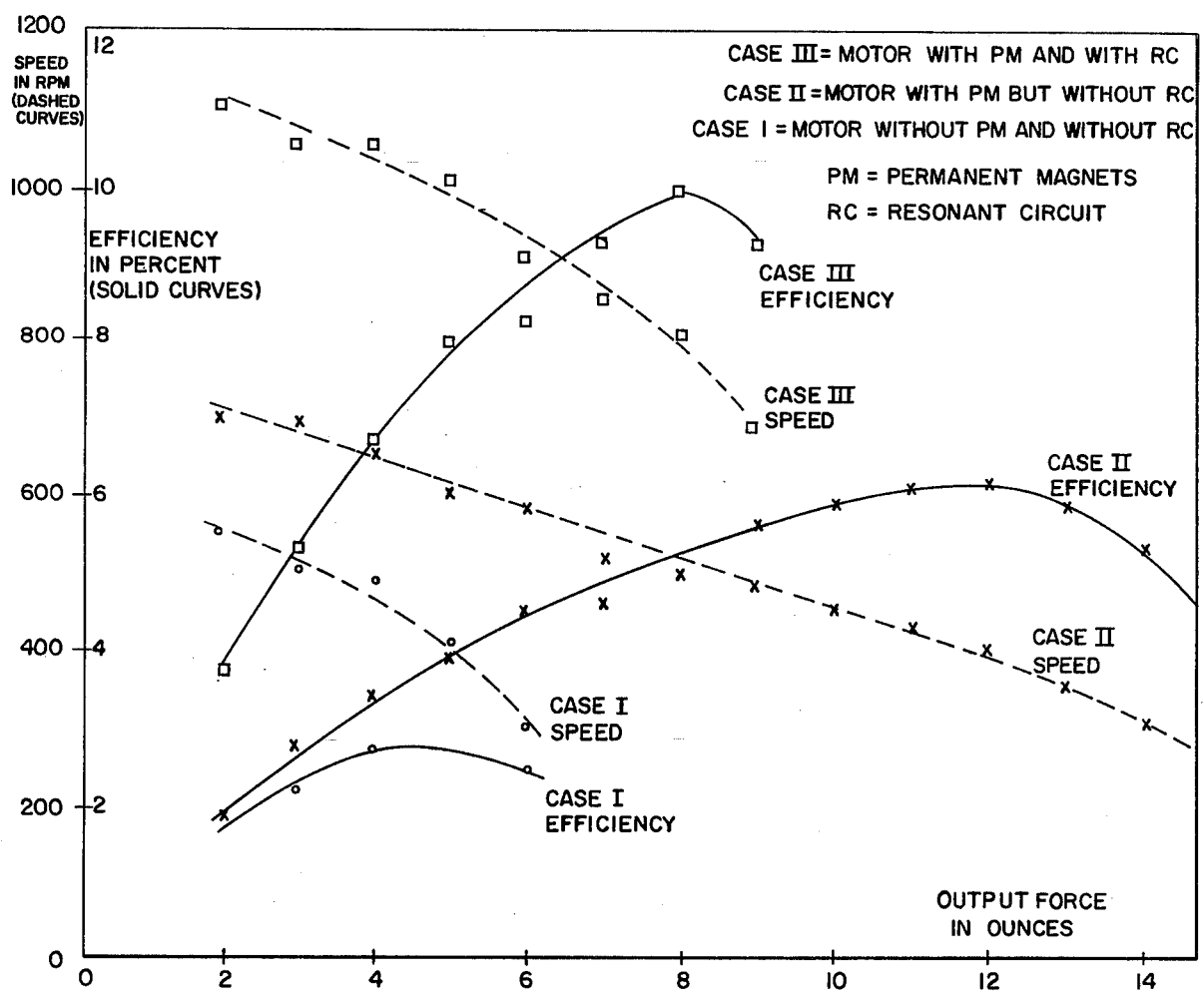
FIG. 12 shows graphically the increased motor efficiency obtainable with the resonant circuit of the present invention.

If a 24 volt supply is connected to a circuit of the type shown in FIG. 12 with a factor Q = 5, then the voltage across the capacitors is 120 volts. For the same circuit, if the applied voltage is 24 volts and the coil resistance is 1 ohm, the oscillating current will be 24 amps FIG. 11 shows that with switch SW in position I the stator B and the rotor B receive current from the battery and their respective capacitors will be charged while rotor A and stator A are in closed circuit through switch SW. If switch SW is moved to position I1 the rotor A and the stator A will receive current from the battery and their respective capacitors will be charged; stator B and rotor B are now in closed circuit through switch SW and their respective capacitors will discharge, producing in the coils of the rotor and the stator a current flow in the opposite direction as that received from the battery.

In a motor of the type shown in FIG. 6 and constructed with relatively close tolerances and having a small air gap between rotor and stator, but having no resonant circuit, high values of counter EMF result and the value of the counter EMF increases with the shaft speed as in any standard motor. Unless a high enough voltage is supplied to the coil, this large counter EMF value will prevent the current through the coil from reaching a high enough value to give the electromagnet a flux approximately equal to that of the permanent magnet. The fluxes of the electromagnet and permanent magnet must be of roughly the same magnitude for the desired increase in efficiency to result. What the resonant circuit of FIG. 11 does is to use the large value of power stored in the circuit to give the electromagnet the same flux as that of the permanent magnet without requiring additional power (or greater voltage to overcome the counter EMF) from the power source.

Naturally, the switching frequency of SW in FIG. 11 has to be approximately equal to the resonant frequency of the circuit. This requires that the shaft speed be held nearly constant so that the shaft-mounted commutator will switch at the resonant frequency, or that the resonant frequency of the circuit be modifiable to coincide with the shaft speed. Those skilled in the art will recognize that a variable capacitance may be used to match the resonant frequency of the circuit to the prevailing load so that optimum efficiency can be maintained at all times.

The increased efficiency can be seen from the following test data which was obtained by the inventor in a set of experiments on a prototype motor of the type described herein. The values given are at the maximum rated capacity.

| TEST | V in volts | I in amps | F oz | Speed rpm |
|---|---|---|---|---|
| I MOTOR WITHOUT PERMANENT MAGNETS, AND WITHOUT RESONANT CIRCUIT | 8.8 | 9.8 | 5 | 400 |
| II MOTOR WITH PERMANENT MAGNETS, AND WITHOUT RESONANT CIRCUIT | 10 | 9 | 12 | 400 |
| III MOTOR WITH PERMANENT MAGNETS AND WITH RESONANT CIRCUIT | 16.5 | 4.5 | 8 | 800 |

The same prototype motor was used in all three tests, the capacitors of the resonant circuit being bypassed for tests without the resonant circuit and the permanent magnets being removable from the rotor. This prevented minor structural variations (such as air gap tolerance) from having any effect on the date from test to test.

From the test data given above which was obtained at maximum rated capacity of the motor, and the following formulas:

ELECTRICAL POWER INPUT = $P_{in} = V_{in} \times I_{in}$
(watts = volts × amps)

MECHANICAL POWER OUTPUT = $P_{out} = F \times r \times 2 \times \text{rev/sec}$

Where $r$ = Distance from the center of the motor shaft to the point of application of force F.

OVERALL EFFICIENCY = $P_{in}/P_{out} \times 100\%$
the following conclusions can be drawn:

| TEST | INPUT POWER $P_{in}$-watts | OUTPUT POWER $P_{out}$-watts | EFFI-CIENCY |
|---|---|---|---|
| I MOTOR WITHOUT PERMANENT MAGNETS, AND WITHOUT RESONANT CIRCUIT | 85.3 | 2.3 | 2.7 |
| II MOTOR WITH PERMANENT MAGNETS, AND WITHOUT RESONANT CIRCUIT | 90.0 | 5.5 | 6.1 |
| III MOTOR WITH PERMANENT MAGNETS AND WITH RESONANT CIRCUIT | 74.3 | 7.3 | 9.9 |

As can be seen in the formula for mechanical power output, both the torque ($F \times r$) and the velocity (rev./sec) are considered. This is necessary because the torque or velocity alone has no significance, since torque can exist without rotational motion. For commercial motors data is often provided about torque to determine at which load the motor will start, but it is relative because through a series of gears the load on the shaft can be varied. The output power of the motor cannot be varied in this manner. Having clarified these concepts of power, it is important to keep in mind that only the power into and power out of the motor is compared herein in evaluating efficiency.

The tests conducted by the inventor included the use of a Prony brake for measuring output power. Such device is well-known to those skilled in the art and further description is unnecessary here. The results of a series of tests conducted on the prototype motor without permanent magnets or resonant circuit, on the motor with permanent magnets and without resonant circuit, and on the motor with permanent magnets and with resonant circuit, are shown in Cases I, II and III of FIG. 12, respectively. Note that the peak efficiency of the Case III arrangement is more than triple that of Case I and about 60% greater than that of Case II. Although the actual efficiency values obtained are relatively low in comparison with commercially manufactured motors, it is to be noted that the values were obtained from tests conducted on a somewhat crude prototype and indicate only the relative increase in efficiency which is possible with the improved motor of the present invention.

I claim:

1. An electric motor comprising at least one rotor assembly and at least one stator assembly; wherein each of said rotor assembly and said stator assembly comprises a ferromagnetic core, a coil wrapped around said core and a permanent magnet positioned for having its flux path shunted through said core, when said coil is de-energized, such that the effective external magnetic flux is substantially zero, and for having its flux additive to that of the electromagnet formed by said core and said coil, when said coil is energized, to form magnetic poles aligned with the poles of said permanent magnet, wherein the magnetic density of said external flux is substantially doubled as compared to the density which would result from a single one of said magnets; said motor including commutator switch means for alternately connecting each said coil to and disconnecting each said coil from an energization source; and each of said stator and rotor assemblies including a capacitor connected in series with each said coil.

2. The device of claim 1, wherein the resonant frequency of each circuit formed by a series-connected coil and capacitor is substantially equal to the switching frequency of said commutator switch means.

3. The device of claim 1, wherein said motor includes a rotatable shaft, said rotor assembly being mounted on said shaft and wherein the switching frequency of said commutator switch means is proportional to the speed of rotation of the motor shaft.

4. The device of claim 3, including means for adjusting a load applied to said shaft, whereby said commutator switching frequency is maintained approximately equal to the resonant frequency of each circuit formed by a said series-connected coil and capacitor.

5. The device of claim 1, including means for adjusting the value of each said capacitor, whereby the resonant frequency of each circuit formed by a said series-connected coil and capacitor is maintained approximately equal to the commutator means switching frequency.

* * * * *